(12) United States Patent
Suzuki

(10) Patent No.: US 7,644,650 B2
(45) Date of Patent: Jan. 12, 2010

(54) WATER HEATER AND COFFEE MAKER FOR AIRCRAFT

(75) Inventor: Jun Suzuki, Tokyo (JP)

(73) Assignee: Jamco Corporation, Tokyo (JP)

( * ) Notice: Subject to any disclaimer, the term of this patent is extended or adjusted under 35 U.S.C. 154(b) by 210 days.

(21) Appl. No.: 11/405,624

(22) Filed: Apr. 18, 2006

(65) Prior Publication Data
US 2007/0051246 A1    Mar. 8, 2007

(30) Foreign Application Priority Data
Sep. 2, 2005    (JP)    ............... 2005-255269

(51) Int. Cl.
A47J 31/00    (2006.01)
(52) U.S. Cl. ............... 99/280; 99/283; 99/295; 99/302 R
(58) Field of Classification Search ............ 99/275, 99/279–323, 495; 392/449, 451; 219/302, 219/303, 305, 299
See application file for complete search history.

(56) References Cited

U.S. PATENT DOCUMENTS

| | | | | |
|---|---|---|---|---|
| 4,256,030 A | * | 3/1981 | de Bruin et al. | ............... 99/295 |
| 5,372,061 A | * | 12/1994 | Albert et al. | ............... 99/281 |
| 5,440,972 A | | 8/1995 | English | |
| 6,634,279 B2 | * | 10/2003 | D'Antonio et al. | ............ 99/285 |
| 6,779,435 B1 | * | 8/2004 | Iacobucci | ............... 99/302 R |
| 6,928,236 B2 | * | 8/2005 | Suzuki et al. | ............... 392/444 |
| 2005/0183580 A1 | * | 8/2005 | Kaminishi et al. | ............ 99/284 |
| 2006/0005712 A1 | * | 1/2006 | Greenwald et al. | ............ 99/275 |

FOREIGN PATENT DOCUMENTS

| | | |
|---|---|---|
| EP | 0 387 515 A1 | 9/1990 |
| EP | 1 157 647 A2 | 11/2001 |
| EP | 1 523 913 A2 | 4/2005 |
| EP | 1759617 A1 * | 3/2007 |
| JP | 2002-46696 | 2/2002 |
| WO | WO 2005/048794 A1 | 6/2005 |

OTHER PUBLICATIONS

European Search Report dated Dec. 11, 2006, issued in corresponding European Patent Application No. 06 40 5120.

* cited by examiner

*Primary Examiner*—Timothy F. Simone
(74) *Attorney, Agent, or Firm*—Westerman, Hattori, Daniels & Adrian, LLP

(57) ABSTRACT

The invention provides an improved water heater and coffee maker for use in an aircraft. A water heater 1 of an aircraft has a water tank 20 to which water from a water tank 10 of the aircraft is fed via a solenoid valve 14 and a flowmeter 16. The water tank 20 is opened to the atmosphere, and it does not form a pressure vessel. The hot water heated by a rapid heating boiler 40 is sent to a coffee server 100, and sprinkled via a hot water shower head 170 into a coffee brewing cup 180. The brewed coffee is pooled in a coffee server 200. An electrostatic level sensor 260 senses the liquid surface level of the coffee, based on which power supply to the boiler is turned off and supply of hot water is stopped.

2 Claims, 4 Drawing Sheets

WATER HEATER AND COFFEE MAKER FOR AIRCRAFT

The present application is based on and claims priority of Japanese patent application No. 2005-255269 filed on Sep. 2, 2005, the entire contents of which are hereby incorporated by reference.

BACKGROUND OF THE INVENTION

1. Field of the Invention

The present invention relates to a water heater disposed in an aircraft and a coffee maker using the water heater.

2. Description of the Related Art

Generally in a water heater disposed in a passenger cabin of an aircraft, drinking water supplied from a main tank of the aircraft is fed to a water tank provided in a service facility placed in a galley or the like. This water tank is a large, airtight tank containing an electrical heater for heating the water in the tank to provide hot water.

One example of a water heater for an aircraft is disclosed in Japanese Patent Application Laid-Open Publication No. 2002-46696 (patent document 1).

Among various beverages served on board the aircraft, coffee is somewhat boiled down and the flavor is lost when it is served, since it is kept hot for a long time after being brewed. It is necessary to lower the heating temperature in order to prevent the coffee from boiling down, which causes another drawback.

Furthermore, since the coffee is brewed automatically, it sometimes overflows from the coffee server.

SUMMARY OF THE INVENTION

The object of the present invention is to provide a water heater and a coffee maker for an aircraft solving the problems of the prior art described above.

A water heater for an aircraft according to the present invention comprises a water tank opened to the atmosphere to which drinking water from a water tank in the aircraft is supplied, a level sensor disposed on the water tank opened to the atmosphere, a solenoid valve and a flowmeter disposed on a pipe connecting the water tank in the aircraft and the water tank opened to the atmosphere, and a rapid heating boiler disposed on a pipe connecting the water tank opened to the atmosphere and a coffee maker.

Further, a coffee maker provided in an aircraft according to the present invention comprises a sensor holder with a level sensor covering an opening at an upper portion of a coffee server stored in a coffee maker, a coffee brewing cup with a coffee pack placed above the sensor holder, and a shower head for sprinkling hot water on an upper surface of the coffee brewing cup.

Furthermore, the coffee maker further comprises a mechanism for moving a table for holding the coffee server up and down, and a means for locking the coffee server at a position in which the coffee server is in close contact with the sensor holder.

As described above, the water heater for an aircraft according to the present invention includes a water tank being opened to the atmosphere to which is supplied water from a water tank of the aircraft, so it has lighter weight compared to the conventional water heater including a pressure vessel.

Moreover, according to the coffee maker of the present invention, the coffee server is fixed to the casing while coffee is brewed, so coffee will not be spilled by turbulence or the like.

DETAILED DESCRIPTION OF THE PREFERRED EMBODIMENTS

Figure 1:
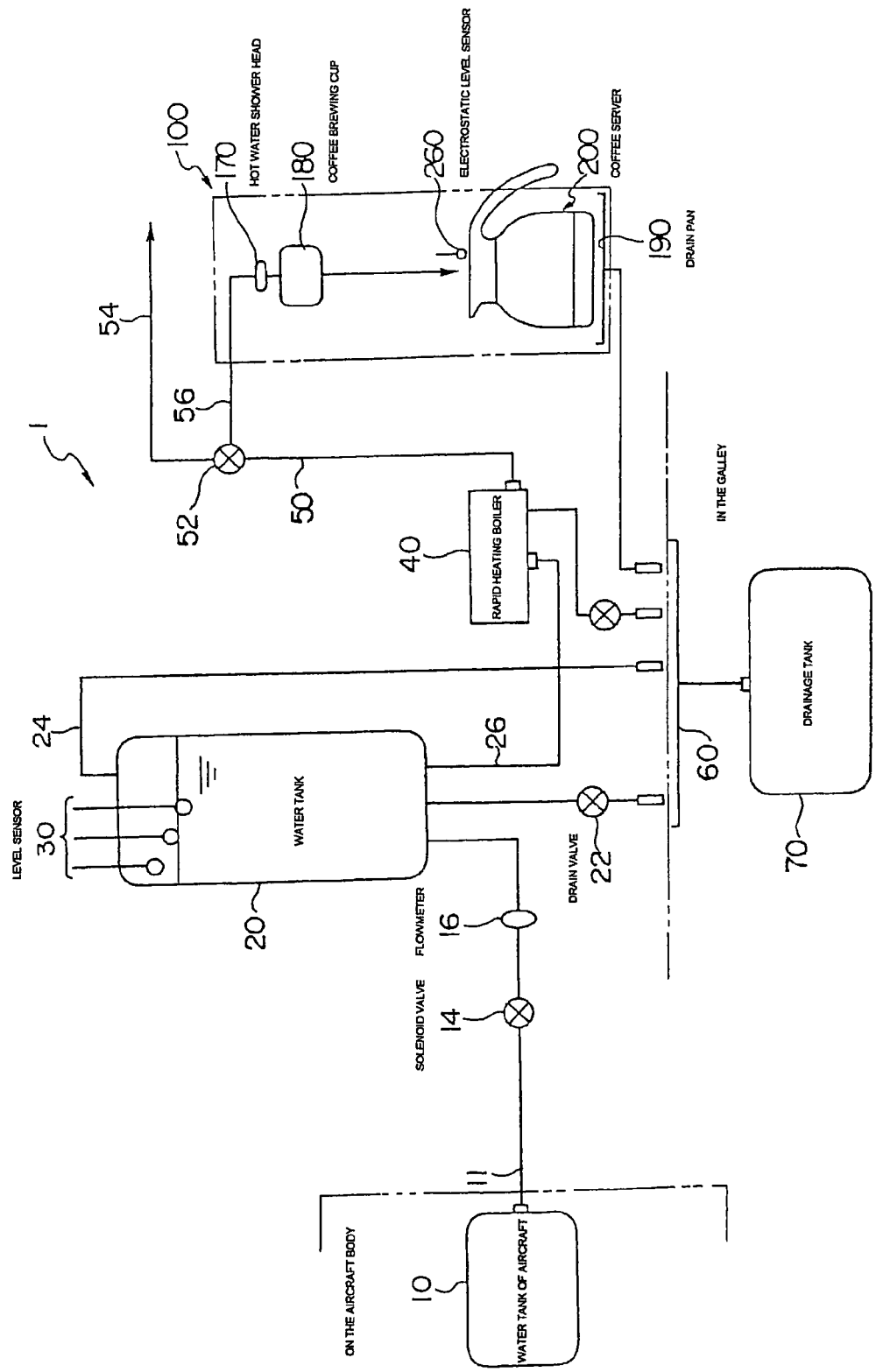
FIG. 1 is an explanatory view showing the structure of a water heater according to the present invention.

FIG. 1 is an explanatory view showing the structure of a water heater according to the present invention.

The water heater denoted as a whole by reference number 1 has a water tank 10 for supplying water to the whole aircraft, and the water from the water tank 10 of the aircraft is supplied via a solenoid valve 14 and a flowmeter 16 disposed on a pipe 11 to a water tank 20 being opened to the atmosphere.

The water tank 20 opened to the atmosphere has a level sensor 30, which prevents overflow of the tank.

Three devices are provided to prevent overflow, which are, a flowmeter for detecting the total amount of supplied water, a level sensor for detecting the amount of water in the water tank, and a capacitance sensor for detecting the surface level of the liquid in a coffee server.

The water tank 20 opened to the atmosphere has a drain valve 22 and a pipe 26 through which water is supplied to a rapid heating boiler 40. The hot water heated in the rapid heating boiler is sent via a pipe 50 to a ball valve 52. A pipe 54 connected to one of the outlet ports of the ball valve 52 is for supplying hot water to other destinations for various purposes, and a pipe 56 connected to the other outlet port of the ball valve 52 is communicated with a coffee maker 100.

Figure 2:
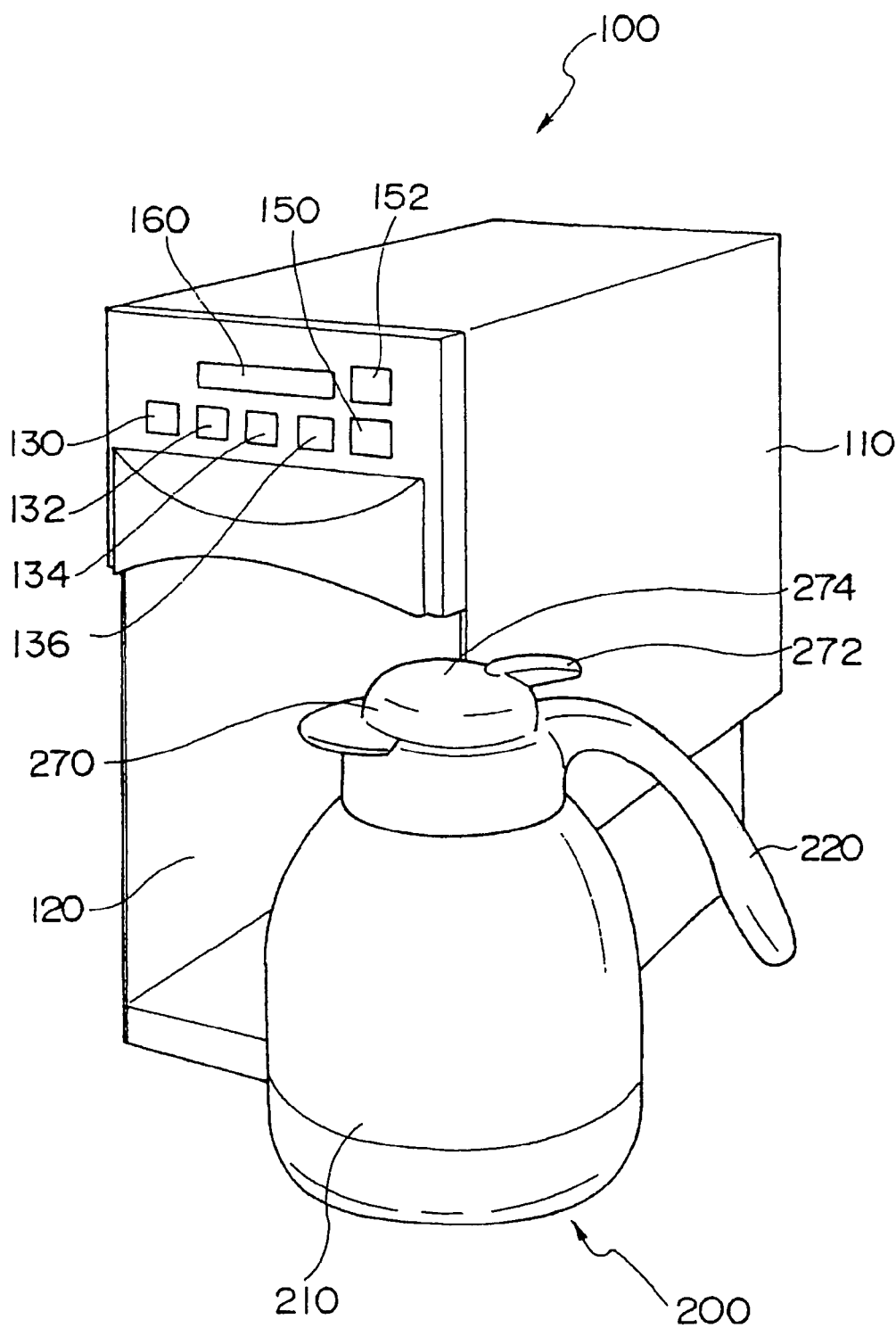
FIG. 2 is an explanatory view showing the appearance of a coffee maker and a coffee server.

FIG. 2 shows the external appearance of a coffee maker 100 and a coffee server 200.

The coffee maker 100 has a box-shaped casing 110, and on the lower portion of the front side of the casing 110 is disposed a storage portion 120 for housing the coffee server 200.

On the upper portion of the front side of the casing 110 are disposed a power button 150, a lock button 152 and various control buttons 130, 132, 134 and 136.

Further, an LCD panel 160 indicating the operation status of the coffee maker is also disposed.

A coffee server 200 includes a body 210 and a handle 220 having a heat insulating property, a cap 274 with a lever 272, a pour spout 270, and so on.

On the interior upper portion of the coffee maker 100 is disposed a coffee brewing cup 180 and a shower head 170 for sprinkling hot water into the brewing cup.

A drain pan 190 is disposed on the bottom portion of the casing 110 for returning drain water via a pan 60 to a drainage tank 70.

Figure 3:
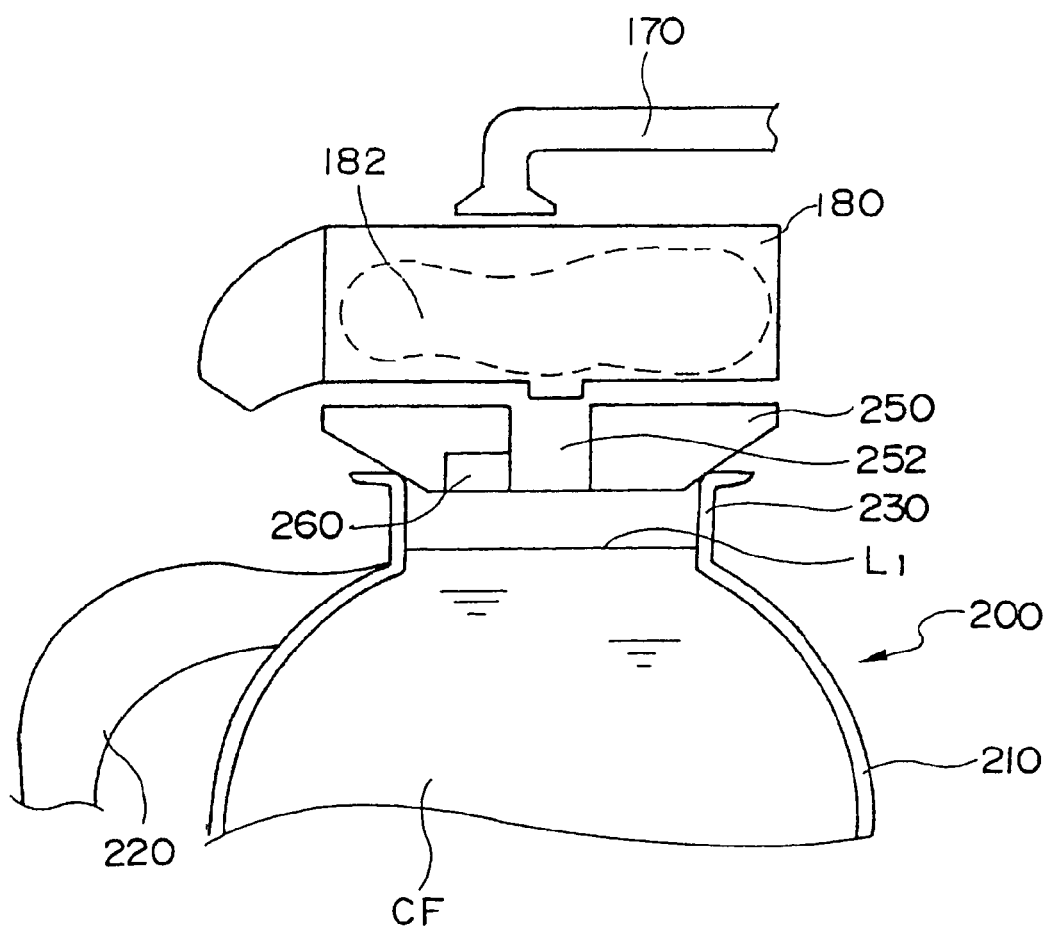
FIG. 3 is an explanatory view showing the process of brewing coffee.

FIG. 3 is an explanatory view illustrating the process for brewing coffee.

A sensor holder 250 is placed on an opening 230 of an empty coffee server 200. On the bottom surface of the sensor holder 250 is attached an electrostatic level sensor 260 for sensing the water level of the coffee inside the coffee server 200.

A coffee brewing cup 180 is placed on the upper portion of the sensor holder 250. A coffee pack 182 is stored in the coffee brewing cup 180, into which hot water is sprinkled through a shower head 170.

Hot water is passed through the coffee pack 182 to brew coffee, and the brewed coffee is pooled in the coffee server 200.

When the water level $L_1$ of the coffee CF in the coffee server 200 reaches a predetermined position, the electrostatic level sensor 260 detects the same and outputs a signal to stop the supply of hot water.

Figure 4:
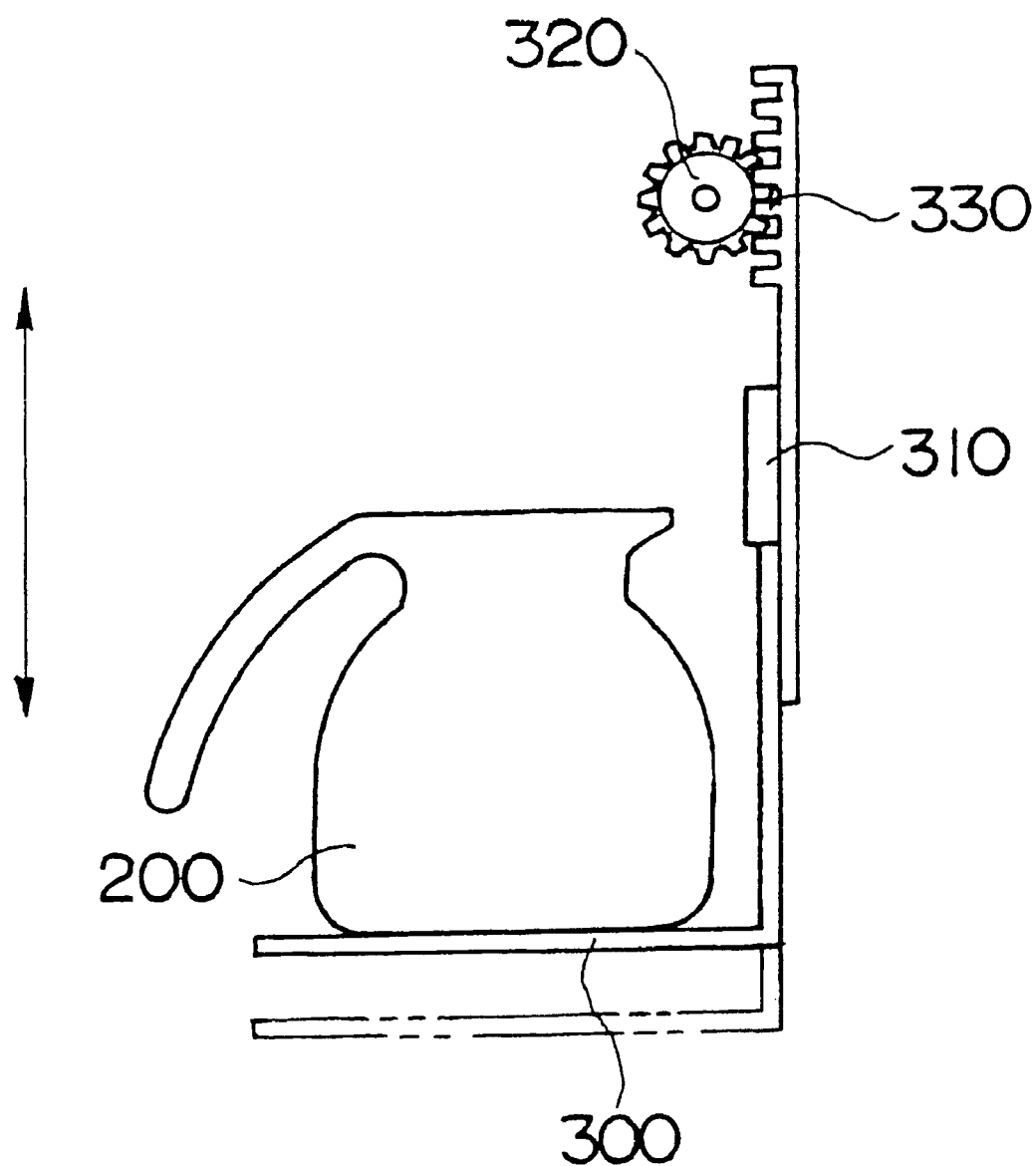
FIG. 4 is an explanatory view showing the mechanism for locking the coffee server in a casing of the coffee maker when brewing coffee on an aircraft.

FIG. 4 illustrates a mechanism to lock the coffee server inside the casing of the coffee maker when brewing coffee on an aircraft.

A table 300 on which the coffee server 200 is placed can be moved up and down via a slide rail 310. The direct current motor 320 moves a rack 330 up and down.

The coffee server 200 is moved up until it contacts the sensor holder 250, then it is locked in that position. The coffee server 200 maintains the locked status.

When serving coffee, the lock is released and the coffee server is carried to the passenger seats.

What is claimed is:

1. A water heater for an aircraft comprising:
    a first water tank in the aircraft that supplies drinking water to a second water tank provided in the aircraft;
    a level sensor disposed on the second water tank;
    a solenoid valve and a flow meter disposed on a first pipe connecting the first water tank and the second water tank; and
    a rapid heating boiler disposed on a second pipe connecting the second water tank and a coffee maker.

2. A coffee maker provided in an aircraft comprising:
    a sensor holder with a level sensor covering an opening at an upper portion of a coffee server stored in a coffee maker;
    a coffee brewing cup storing a package of coffee is placed above the sensor holder; and
    a shower head for sprinkling hot water on an upper surface of the coffee brewing cup,
    a mechanism for moving a table for holding the coffee server up and down; and
    a means for locking the coffee server at a position in which the coffee server is in close contact with the sensor holder.

* * * * *